United States Patent
Zhang et al.

(10) Patent No.: US 11,552,735 B2
(45) Date of Patent: Jan. 10, 2023

(54) PUNCTURING UNIT FOR SOUNDING REFERENCE SIGNAL (SRS) COMB PATTERNS WITH CYCLIC SHIFTING

(71) Applicant: QUALCOMM Incorporated, San Diego, CA (US)

(72) Inventors: Xiaoxia Zhang, San Diego, CA (US); Lorenzo Ferrari, Oakland, CA (US); Srinivas Yerramalli, Hyderabad (IN); Yih-Hao Lin, San Diego, CA (US); Jing Sun, San Diego, CA (US); Alexandros Manolakos, Escondido, CA (US); Rajat Prakash, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/350,931

(22) Filed: Jun. 17, 2021

(65) Prior Publication Data

US 2021/0409152 A1    Dec. 30, 2021

Related U.S. Application Data

(60) Provisional application No. 63/045,819, filed on Jun. 29, 2020.

(51) Int. Cl.
*H04L 1/00*    (2006.01)
*H04L 25/02*    (2006.01)
(Continued)

(52) U.S. Cl.
CPC .......... *H04L 1/0069* (2013.01); *H04L 5/0051* (2013.01); *H04L 25/0226* (2013.01);
(Continued)

(58) Field of Classification Search
CPC ............. H04L 5/00514; H04L 25/0226; H04L 1/0069; H04L 5/0094; H04L 5/0062;
(Continued)

(56) References Cited

U.S. PATENT DOCUMENTS

| 2019/0261454 A1 | 8/2019 | Xiong et al. |
| 2019/0380123 A1 | 12/2019 | Yang et al. |

(Continued)

OTHER PUBLICATIONS

International Search Report and Written Opinion—PCT/US2021/038012—ISA/EPO—dated Oct. 8, 2021.

*Primary Examiner* — Brian D Nguyen
(74) *Attorney, Agent, or Firm* — QC205502/TMP

(57) ABSTRACT

Disclosed are techniques for wireless communication. In an aspect, a user equipment (UE) receives a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit comprises one or more time units of the comb pattern, and wherein each of the one or more time units comprises two or more symbols, and refrains from transmitting all SRS transmissions of the at least one SRS resource within a first puncturing unit of the one or more puncturing units based on a determination that one or more SRS transmissions of the at least one SRS resource within the first puncturing unit are to be dropped.

30 Claims, 16 Drawing Sheets

```
                            ┌────┐
                            │ UE │
                            └────┘
                               │
┌──────────────────────────────▼──────────────────────────────┐
│ Receive a sounding reference signal (SRS) resource          │
│ configuration, the SRS resource configuration indicating    │ ─── 910
│ at least a comb pattern for at least one SRS resource       │
│ allocated to the UE and a puncturing unit for the comb      │
│ pattern, wherein the comb pattern is divided into one or    │
│ more puncturing units, wherein each puncturing unit of the  │
│ one or more puncturing units comprises one or more time     │
│ units of the comb pattern, and wherein each of the one or   │
│ more time units of the comb pattern comprises two or more   │
│ symbols                                                     │
└──────────────────────────────┬──────────────────────────────┘
                               │
┌──────────────────────────────▼──────────────────────────────┐
│ Refrain from transmitting all SRS transmissions of the at   │
│ least one SRS resource within a first puncturing unit of    │ ─── 920
│ the one or more puncturing units based on a determination   │
│ that one or more SRS transmissions of the at least one SRS  │
│ resource within the first puncturing unit are to be dropped │
└─────────────────────────────────────────────────────────────┘
```

(51) Int. Cl.
*H04L 27/26* (2006.01)
*H04L 5/00* (2006.01)
*H04W 72/04* (2009.01)

(52) U.S. Cl.
CPC ..... *H04L 27/2607* (2013.01); *H04W 72/0413* (2013.01); *H04W 72/0453* (2013.01)

(58) Field of Classification Search
CPC .......... H04L 27/2603; H04L 27/26134; H04L 27/2607; H04L 27/2613; H04L 5/0037; H04L 5/001; H04L 5/0021; H04W 72/0453; H04W 72/0413
See application file for complete search history.

(56) References Cited

U.S. PATENT DOCUMENTS

| | | | |
|---|---|---|---|
| 2020/0044721 A1* | 2/2020 | Choi | H04L 5/0053 |
| 2020/0177353 A1* | 6/2020 | Ding | H04L 5/005 |
| 2020/0228213 A1* | 7/2020 | Masai | H04W 24/10 |
| 2021/0135808 A1* | 5/2021 | Choi | H04L 5/0051 |
| 2021/0250797 A1* | 8/2021 | Karjalainen | H04B 17/336 |
| 2022/0052813 A1* | 2/2022 | Si | H04L 5/0094 |
| 2022/0224498 A1* | 7/2022 | Cha | H04L 5/0092 |
| 2022/0231816 A1* | 7/2022 | Si | H04L 5/0053 |
| 2022/0263621 A1* | 8/2022 | Cha | H04W 52/242 |

* cited by examiner

600

| $e^{jan}$ | $e^{jan}$ | $e^{jan}$ | $e^{jan}$ |
|---|---|---|---|
|  |  |  |  |
|  |  |  |  |
|  |  |  |  |
| ... | ... | ... | ... |
|  |  |  |  |
|  |  |  |  |
|  |  |  |  |
| $e^{ja3}$ | $e^{ja3}$ | $e^{ja3}$ | $e^{ja3}$ |
|  |  |  |  |
|  |  |  |  |
|  |  |  |  |
| $e^{ja2}$ | $e^{ja2}$ | $e^{ja2}$ | $e^{ja2}$ |
|  |  |  |  |
|  |  |  |  |
|  |  |  |  |
| $e^{ja1}$ | $e^{ja1}$ | $e^{ja1}$ | $e^{ja1}$ |
|  |  |  |  |
|  |  |  |  |
|  |  |  |  |
| $e^{ja0}$ | $e^{ja0}$ | $e^{ja0}$ | $e^{ja0}$ |

Example:
Comb-4 with 8 symbols

820 →

Puncturing Unit

Base station assigns cyclic
shift with 4-symbol staggering

Base station assigns cyclic shift
with 2-symbol staggering

Base station assigns cyclic
shift without staggering

PUNCTURING UNIT FOR SOUNDING REFERENCE SIGNAL (SRS) COMB PATTERNS WITH CYCLIC SHIFTING

CROSS-REFERENCE TO RELATED APPLICATIONS

The present application for patent claims the benefit of U.S. Provisional Application No. 63/045,819, entitled "PUNCTURING UNIT FOR SOUNDING REFERENCE SIGNAL (SRS) COMB PATTERNS WITH CYCLIC SHIFTING," filed Jun. 29, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and refraining from transmitting all SRS transmissions of the at least one SRS resource within a first puncturing unit of the one or more puncturing units based on a determination that one or more SRS transmissions of the at least one SRS resource within the first puncturing unit are to be dropped.

In an aspect, a user equipment (UE) includes a memory; at least one transceiver; and at least one processor communicatively coupled to the memory and the at least one transceiver, the at least one processor configured to: receive, via the at least one transceiver, a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and refrain from transmitting all SRS transmissions of the at least one SRS resource within a first puncturing unit of the one or more puncturing units based on a determination that one or more SRS transmissions of the at least one SRS resource within the first puncturing unit are to be dropped.

In an aspect, a user equipment (UE) includes means for receiving a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and means for refraining from transmitting all SRS transmissions of the at least one SRS resource within a first puncturing unit of the one or more puncturing units based on a determination that one or more SRS transmissions of the at least one SRS resource within the first puncturing unit are to be dropped.

In an aspect, a non-transitory computer-readable medium stores computer-executable instructions that, when executed by a user equipment (UE), cause the UE to: receive a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and refrain from transmitting all SRS transmissions of the at least one SRS resource within a first puncturing unit of the one or more puncturing units based on a determination that one or more SRS transmissions of the at least one SRS resource within the first puncturing unit are to be dropped.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 6 is a diagram illustrating how a legacy cyclic shift is applied on the frequency grid for a four-symbol SRS resource.

DETAILED DESCRIPTION

Figure 1:
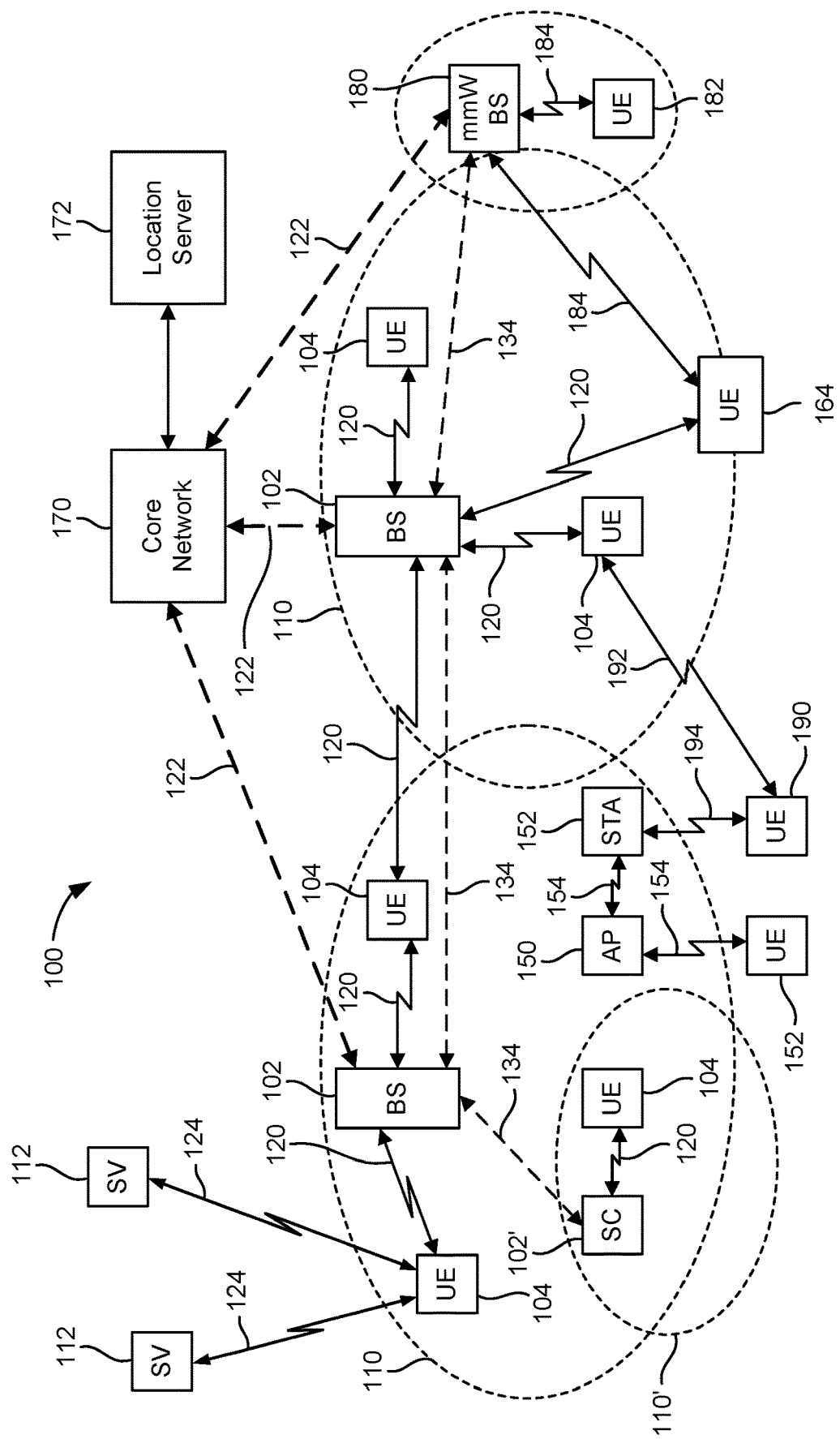
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
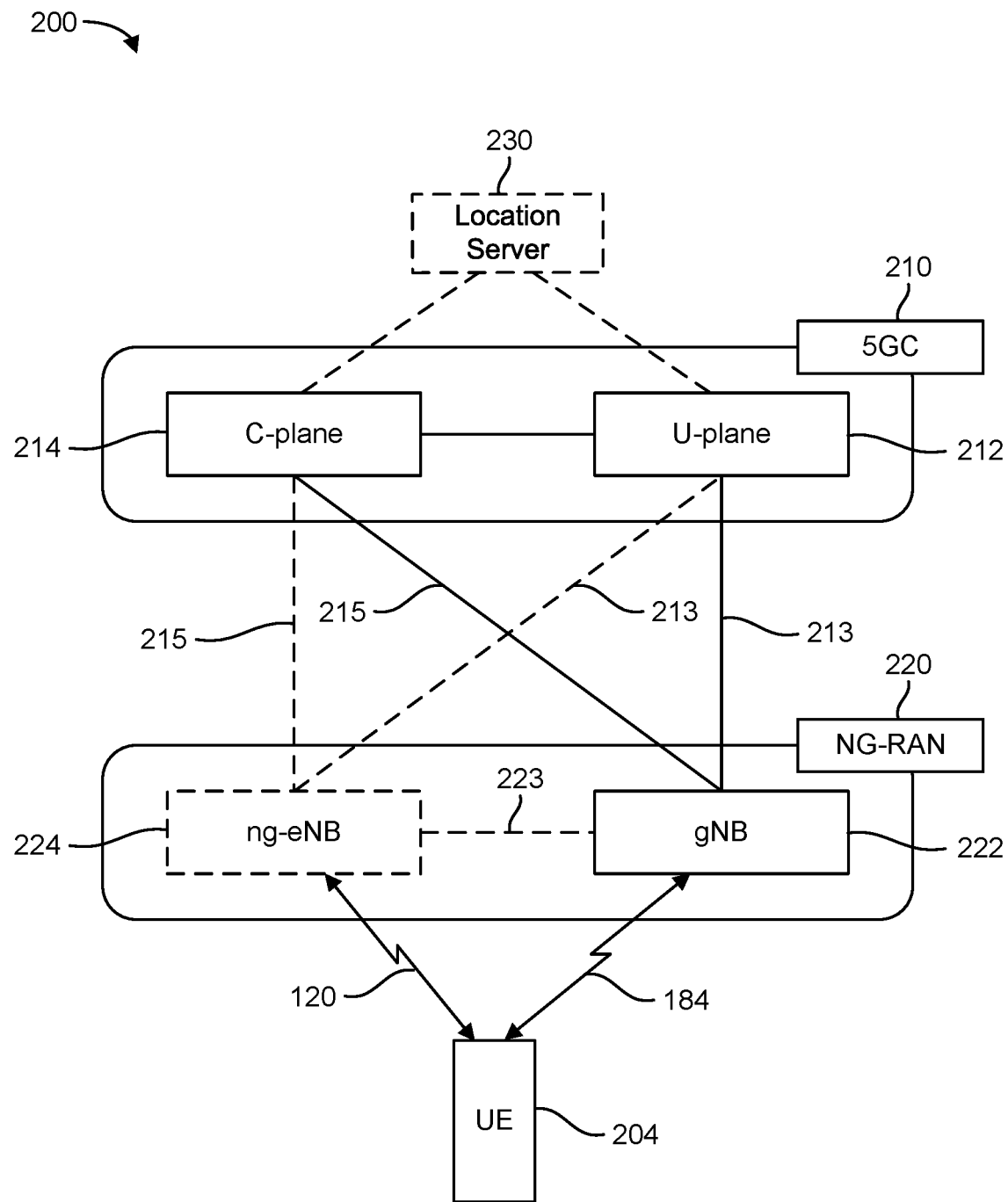
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C)

215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
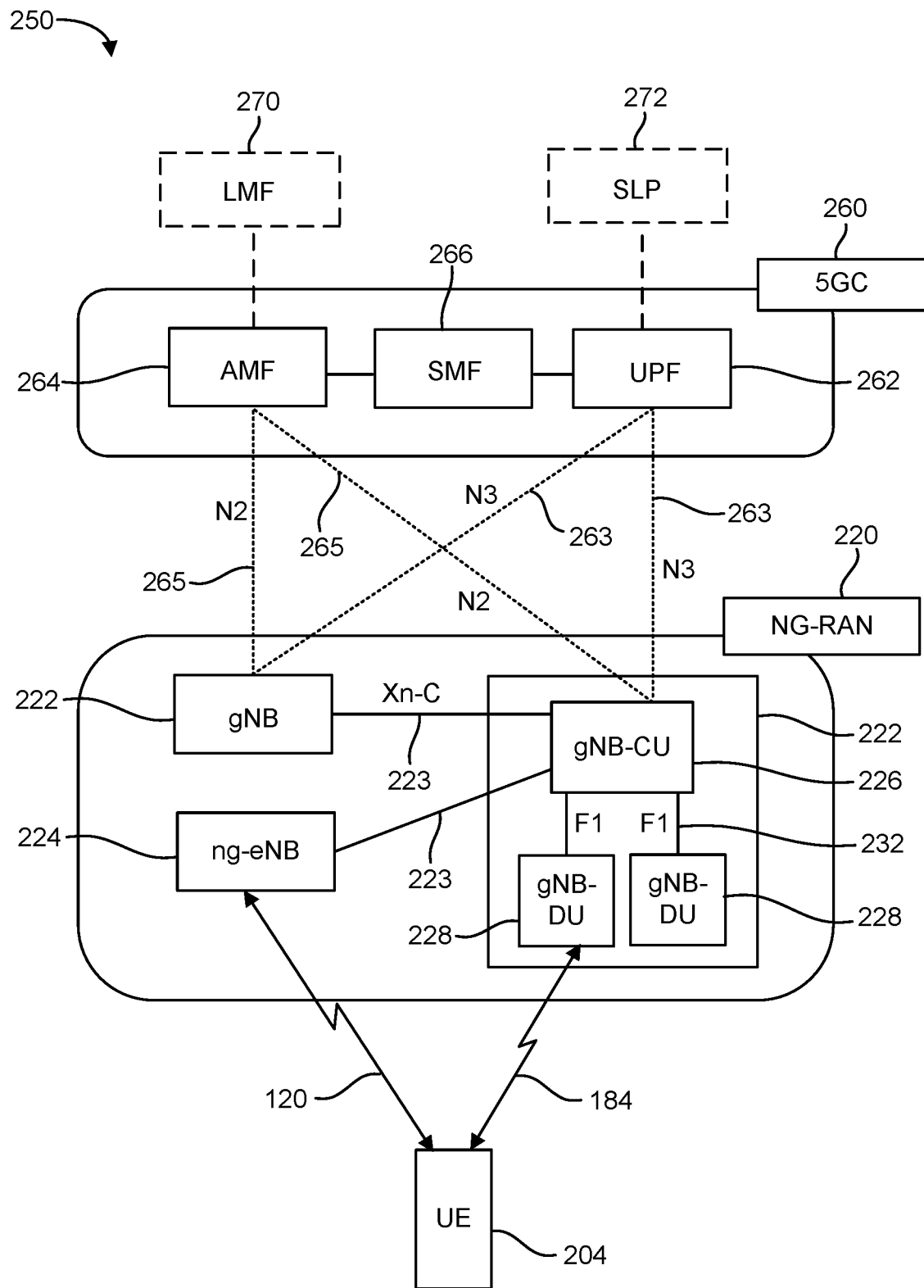

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
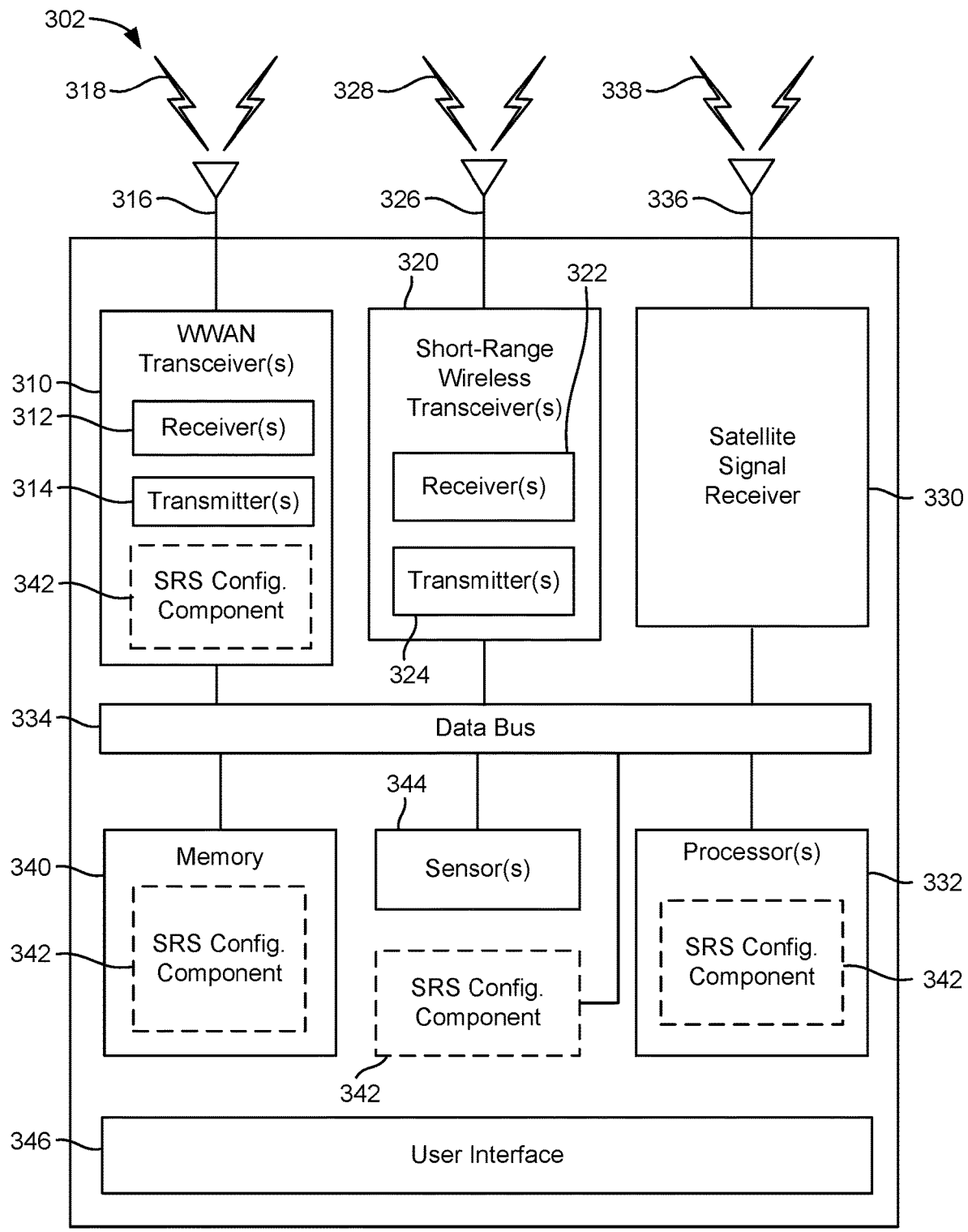
FIGS. 3A, 3B, and 3C are simplified block diagrams of several sample aspects of components that may be employed in a user equipment (UE), a base station, and a network entity, respectively, and configured to support communications as taught herein.
Figure 3B:
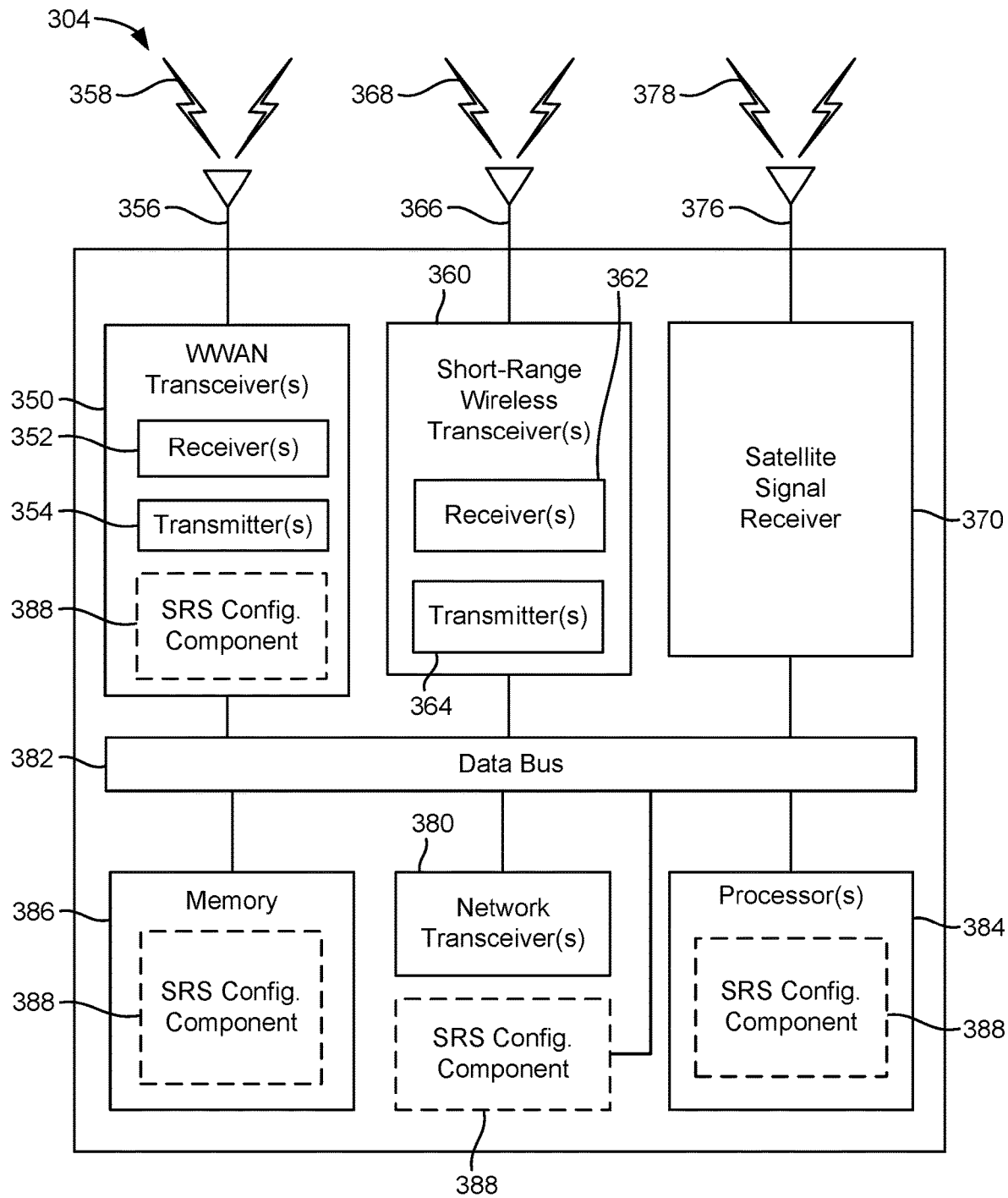
Figure 3C:
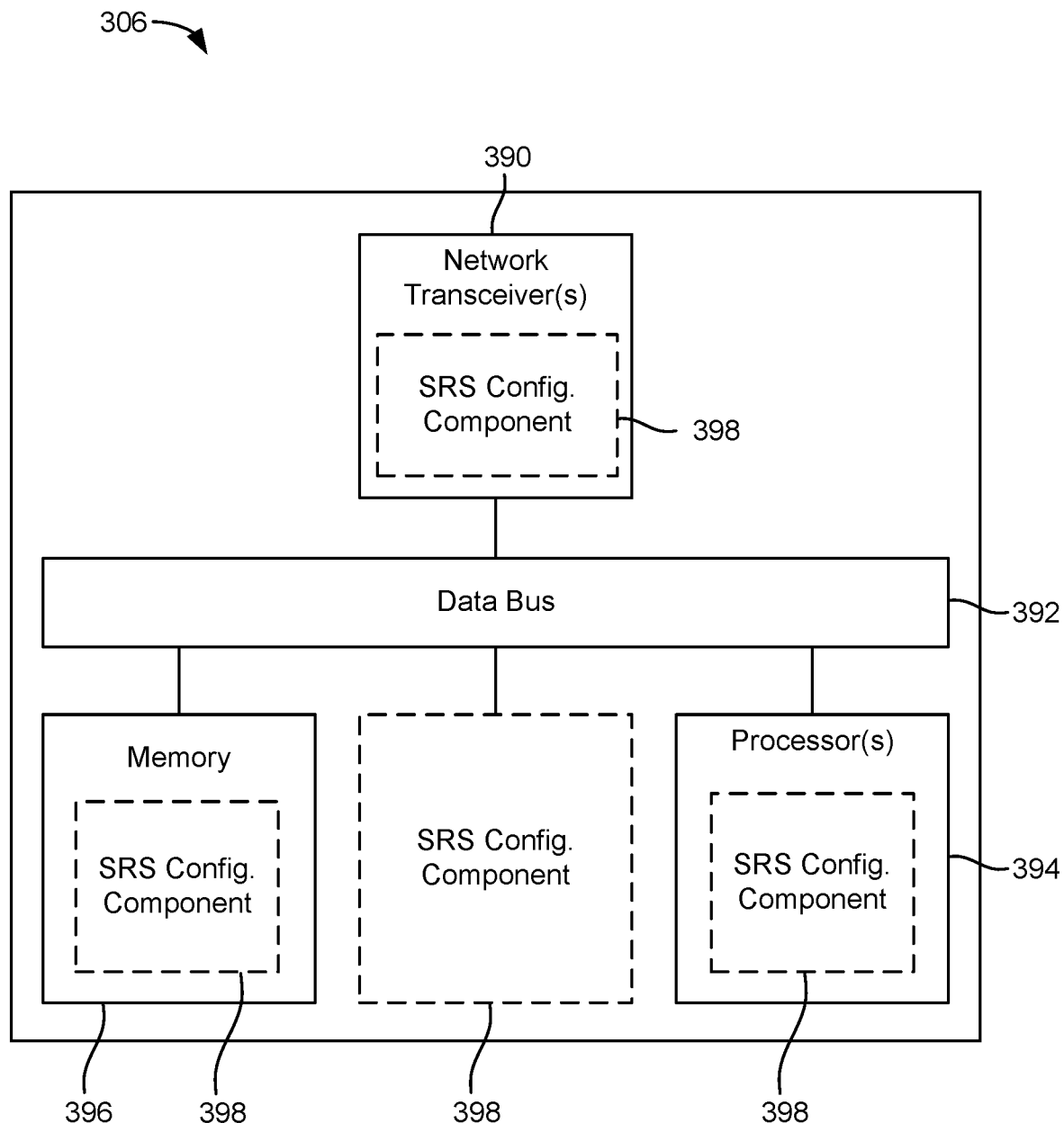

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include SRS configuration component 342, 388, and 398, respectively. The SRS configuration component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the SRS configuration component 342, 388, and 398 may be external to the processors 332, 384, and 394 (e.g., part of a modem processing system, integrated with another processing system, etc.). Alternatively, the SRS configuration component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the SRS configuration component 342, which may be, for example, part of the one or more WWAN transceivers 310, the memory 340, the one or more processors 332, or any combination thereof, or may be a standalone component. FIG. 3B illustrates possible locations of the SRS configuration component 388, which may be, for example, part of the one or more WWAN transceivers 350, the memory 386, the one or more processors 384, or any combination thereof, or may be a standalone component. FIG. 3C illustrates possible locations of the SRS configuration component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the SRS configuration component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4A:
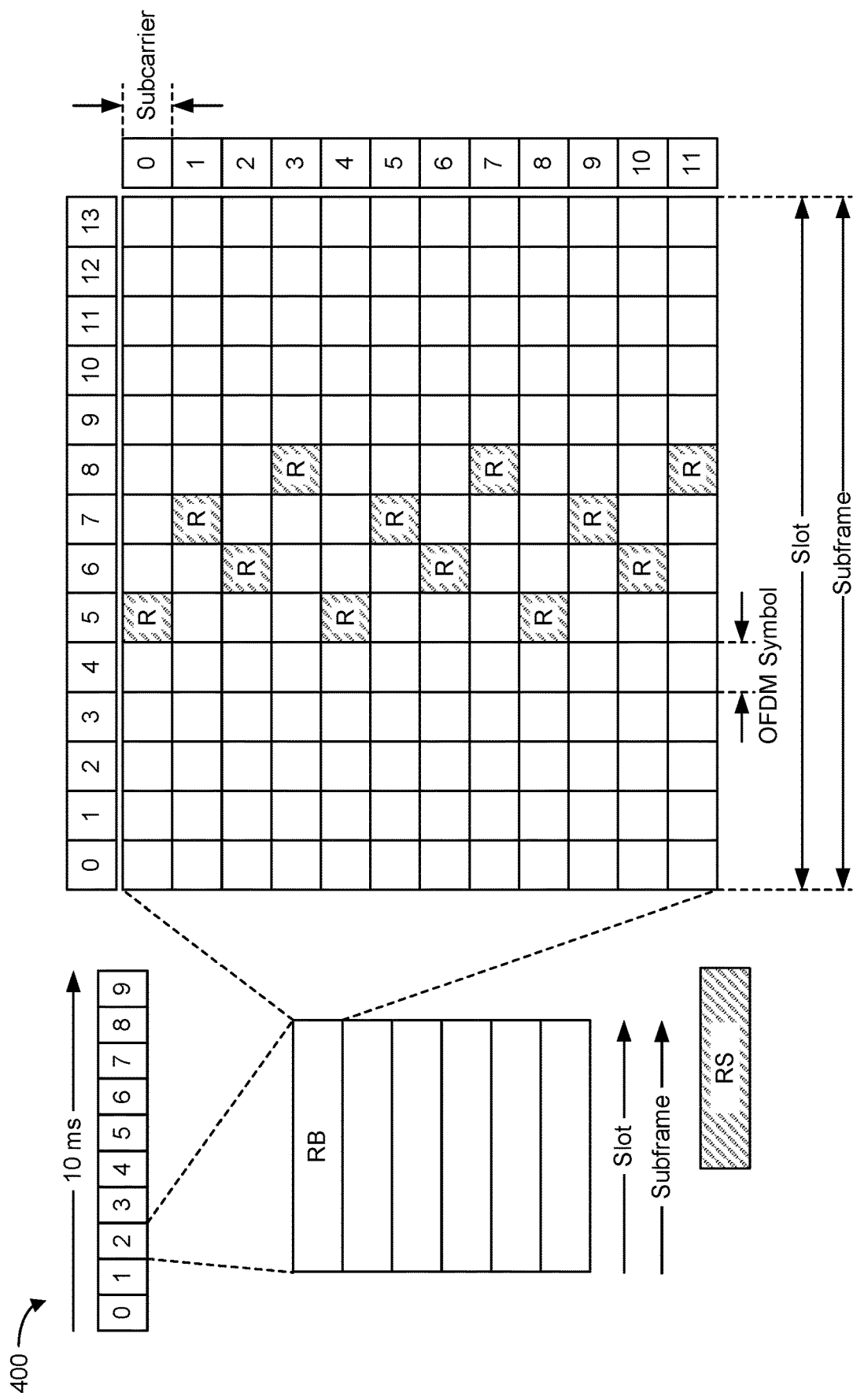
FIG. 4A is a diagram illustrating an example frame structure, according to aspects of the disclosure.

Various frame structures may be used to support downlink and uplink transmissions between network nodes (e.g., base stations and UEs). FIG. 4A is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4A, a numerology of 15 kHz is used. Thus, in the time domain, a 10 ms frame is divided into 10 equally sized subframes of 1 ms each, and each subframe includes one time slot. In FIG. 4A, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4A, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4A illustrates example locations of REs carrying a reference signal (labeled "R").

In an aspect, the reference signal carried on the REs labeled "R" may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4A, the illustrated SRS is comb-4 over four symbols. That is, the locations of the shaded SRS REs indicate a comb-4 SRS resource configuration.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or DCI).

Figure 4B:
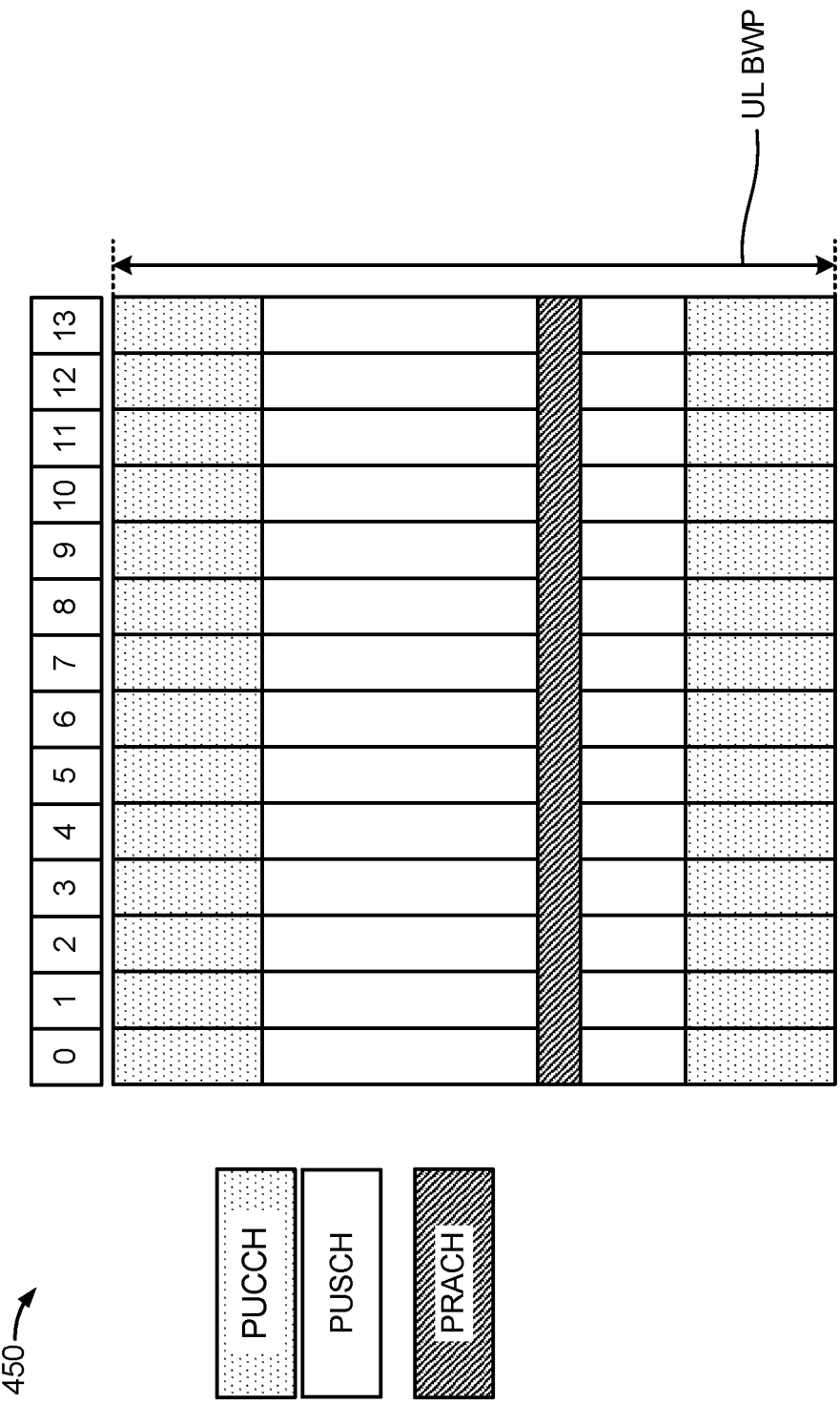
FIG. 4B is a diagram illustrating various uplink channels within an example uplink slot, according to aspects of the disclosure.

FIG. 4B is a diagram 450 illustrating various uplink channels within an example uplink slot. In FIG. 4B, time is represented horizontally (on the X axis) with time increasing from left to right, while frequency is represented vertically (on the Y axis) with frequency increasing (or decreasing) from bottom to top. In the example of FIG. 4B, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Referring back to SRS, as described above, SRS and SRS-for-positioning (collectively "SRS" and distinguished by the context) may be transmitted within a resource block with a given comb pattern. Currently, an SRS resource may span 1, 2, 4, 8, or 12 consecutive symbols within a slot with a comb size of comb-2, comb-4, or comb-8. The following table shows the frequency offsets from symbol to symbol for the SRS comb patterns that are currently supported.

TABLE 1

| Comb | 1 Symbol | 2 Symbols | 4 Symbols | 8 Symbols | 12 Symbols |
|---|---|---|---|---|---|
| 2 | {0} | {0, 1} | {0, 1, 0, 1} | NA | NA |
| 4 | NA | {0, 2} | {0, 2, 1, 3} | {0, 2, 1, 3, 0, 2, 1, 3} | {0, 2, 1, 3, 0, 2, 1, 3, 0, 2, 1, 3} |
| 8 | NA | NA | {0, 4, 2, 6} | {0, 4, 2, 6, 1, 5, 3, 7} | {0, 4, 2, 6, 1, 5, 3, 7, 0, 4, 2, 6} |

Figure 5A:
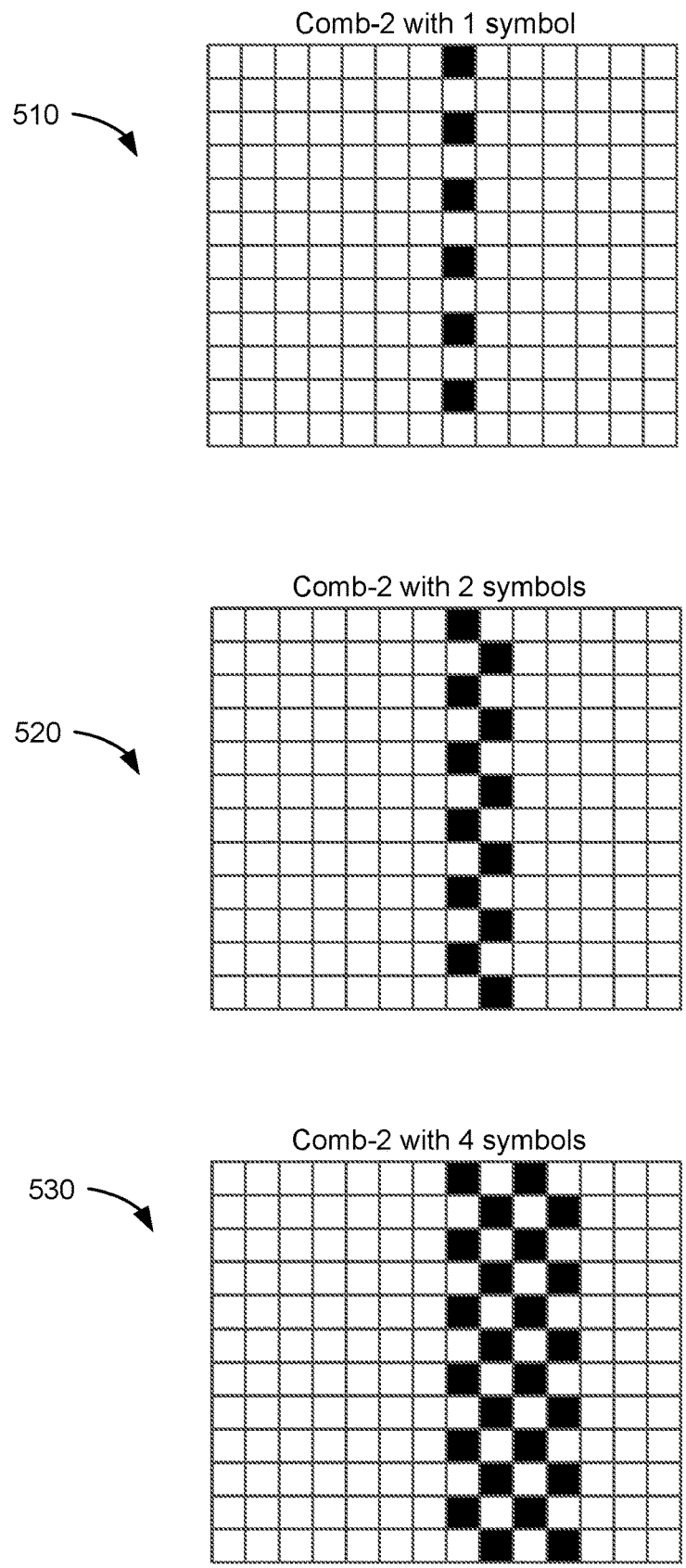
FIGS. 5A to 5C illustrate various comb patterns supported for uplink SRS within a resource block.
Figure 5B:
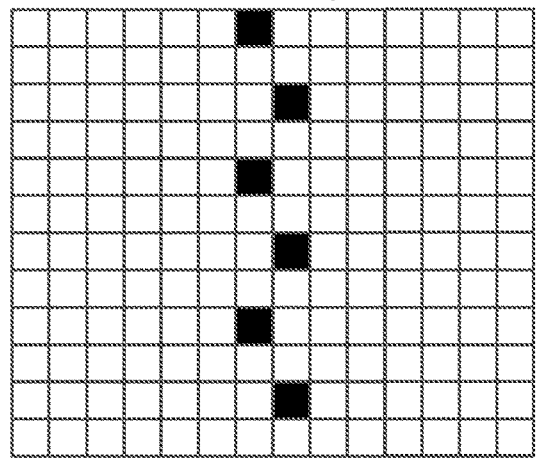
Figure 5B:
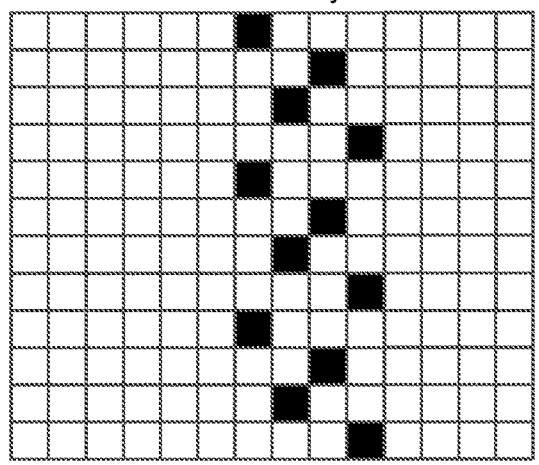
Figure 5B:
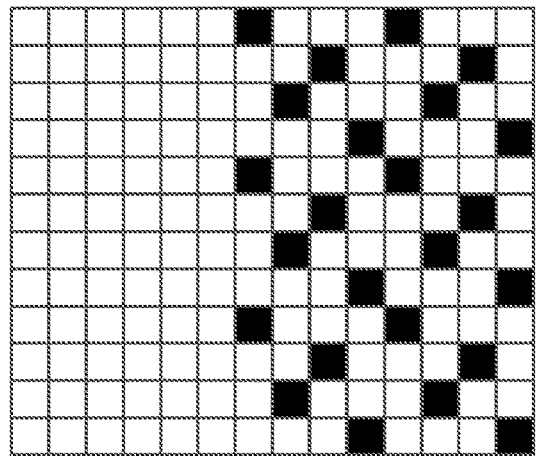
Figure 5C:
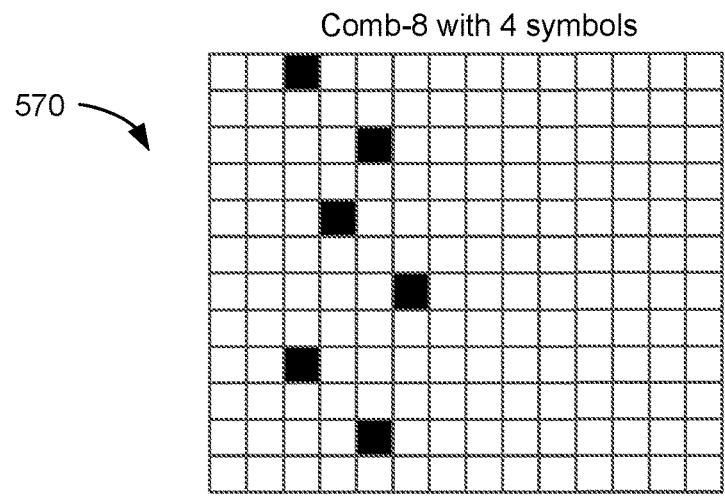
Figure 5C:
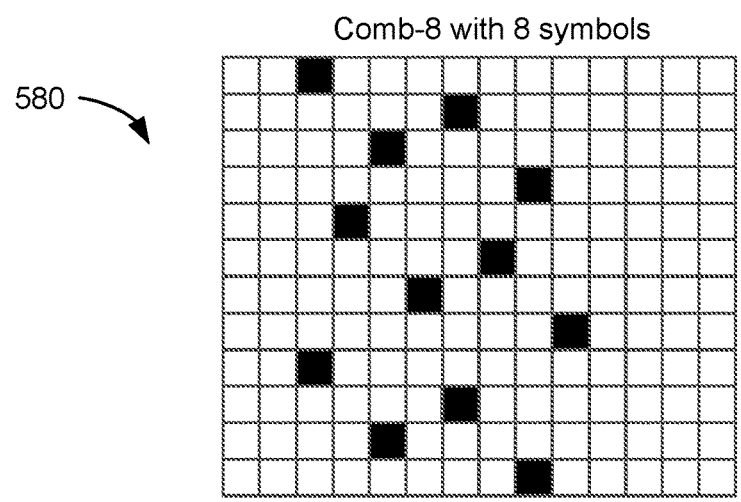
Figure 5C:
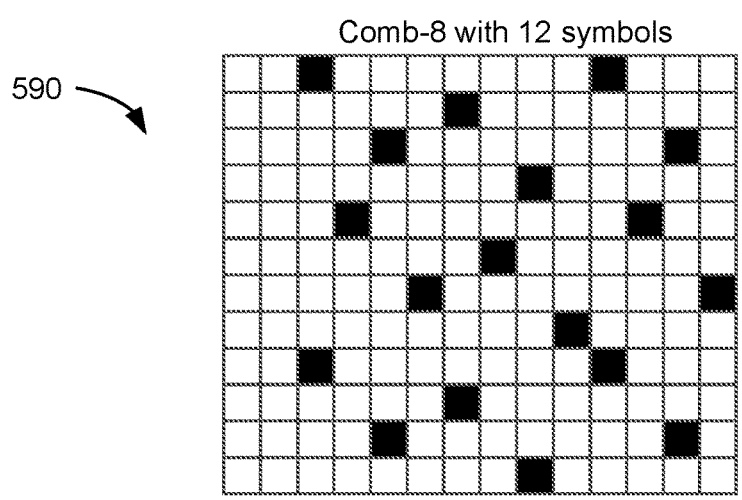

FIGS. 5A to 5C illustrate various comb patterns supported for SRS within a resource block. The illustrated comb patterns correspond to various comb patterns shown in Table 1 above. Each comb pattern is illustrated within a single resource block. In each resource block, frequency is represented vertically and time is represented horizontally. Each block of each resource block represents an RE, and each shaded block represents an RE carrying SRS. All of the REs carrying SRS within a resource block correspond to an SRS resource.

FIG. 5A illustrates a comb pattern 510 for comb-2 with one symbol, a comb pattern 520 for comb-2 with two symbols, and a comb pattern 530 for comb-2 with four symbols. FIG. 5B illustrates a comb pattern 540 for comb-4 with two symbols, a comb pattern 550 for comb-4 with four symbols, and a comb pattern 560 for comb-4 with eight symbols. The comb pattern for comb-4 with 12 symbols is not illustrated, but as shown in Table 1, it is similar to comb-4 with eight symbols but with four more symbols having a repeated pattern of offsets {0, 2, 1, 3}. FIG. 5C illustrates a comb pattern 570 for comb-8 with four symbols, a comb pattern 580 for comb-8 with eight symbols, and a comb pattern 590 for comb-8 with 12 symbols.

As can be seen in FIGS. 5A to 5C, the shaded REs (i.e., REs carrying SRS) are offset from each other across symbols according to the values in Table 1. For example, from Table 1, comb pattern 550 has an offset pattern of {0, 2, 1, 3}. As shown, this means that the first (bottom) RE in the first (leftmost) symbol has an offset of zero tones from the first (bottom) tone of the resource block, the first RE in the second symbol has an offset of two tones from the first tone of the resource block, the first RE in the third symbol has an offset of one tone from the first tone of the resource block, and the first RE in the fourth symbol has an offset of three tones from the first tone of the resource block. The pattern then repeats for the remaining REs of the comb pattern. As can be seen, the offsets cause the REs to be "staggered" in frequency, which is referred to as comb staggering.

SRS-for-positioning utilize comb staggering, as illustrated in Table 1 and FIGS. 5A to 5C, to provide a larger observation range for the receiver. That is, the receiver (e.g., a base station, another UE, etc.) will collapse all symbols of the SRS resource (when the different symbols of the SRS resource have a different comb offset) into a single comb-1-equivalent symbol to maximize the ToA range. SRS are also defined by a cyclic shift (a) of a base sequence. A cyclic shift in the time domain is equivalent to a phase rotation in the frequency domain. The base sequence is cyclic shifted to increase the total number of available sequences. For frequency non-selective channels over the 12 subcarriers of a resource block, it is possible to achieve orthogonality between SRS generated from the same base sequence. The orthogonality can be exploited to allow different UEs to transmit SRS at the same time using the same frequency resources without interfering with each other. This is referred to as UE multiplexing.

However, the time domain cyclic shift pattern designed for the SRS staggering structure is not currently supported in NR. This means that, for UE multiplexing purposes, the legacy (e.g., LTE) time domain cyclic shift pattern designed for the legacy non-staggered comb structure would be applied to the staggered comb structure for SRS in NR.

The allocation of cyclic shifts over a combed signal, such as SRS, folds the cyclic shift range within the comb duration so that the time-domain representation of the cyclic shift is periodic. In the legacy (e.g., LTE) SRS, the cyclic shift is applied to each symbol equally, as shown in FIG. 6. Specifically, FIG. 6 is a diagram 600 illustrating how a legacy cyclic shift is applied on the frequency grid for a four-symbol SRS resource. In FIG. 6, frequency is represented vertically and time is represented horizontally. Each block represents an RE and each shaded block represents an RE carrying SRS. As shown, the SRS resource has a comb-4 pattern. The cyclic shift for each RE is represented as $e^{j\alpha n}$. Each symbol is self-contained, meaning that the cyclic frequency increases from $e^{j\alpha 0}$ to $e^{j\alpha n}$ within each symbol.

While this is the correct behavior for a non-staggered SRS comb, it should be modified when a fully or partially staggered pattern is used, to utilize the full range of the comb-1-equivalent symbol obtained by the combination of all symbols in the SRS resource. One way to resolve this issue is to have the sequence distributed over the full SRS resource so that each symbol in the comb pattern features a part of the cyclic shift sequence.

Figure 7:
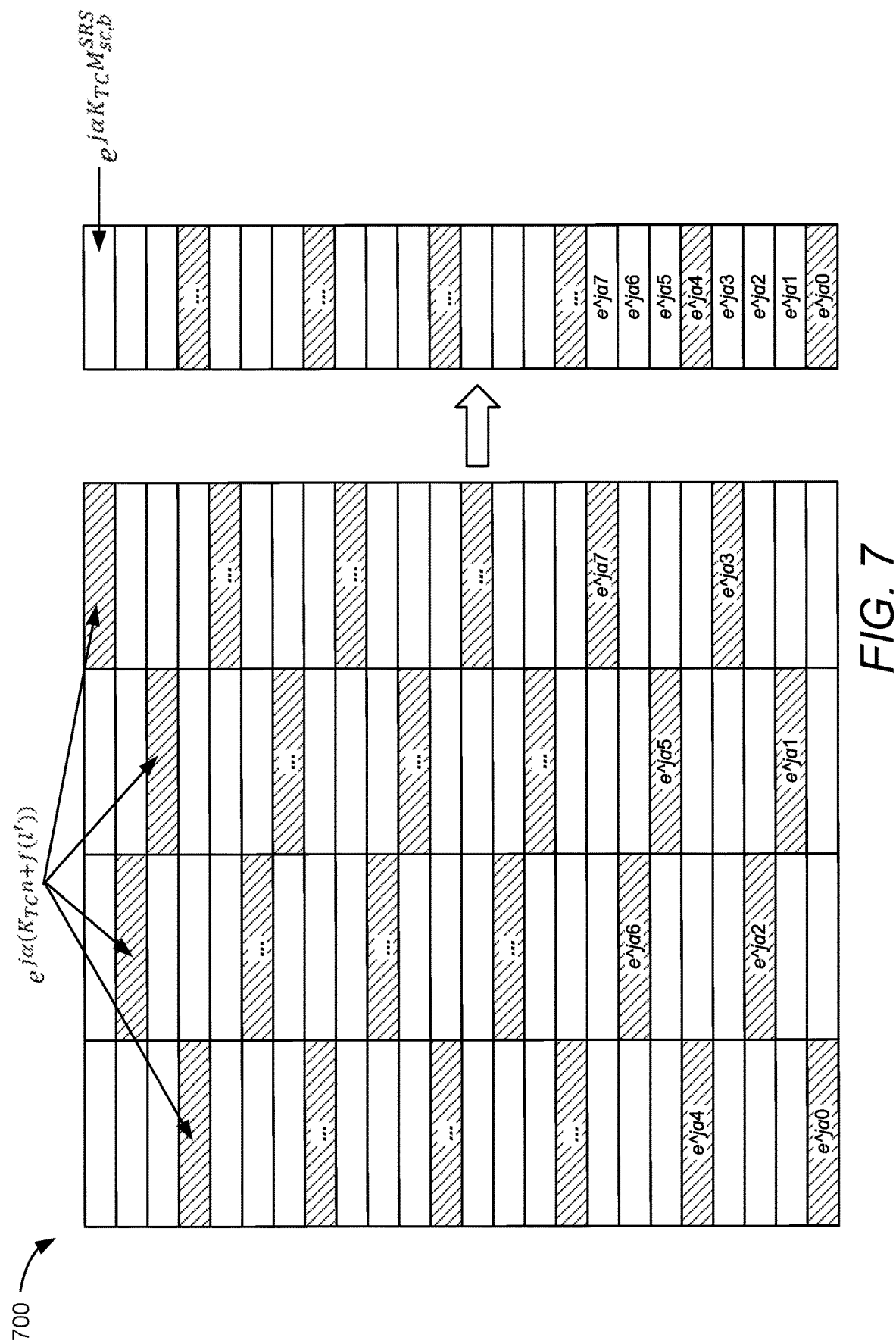
FIG. 7 is a diagram of an example allocation of cyclic shifts that would extend the space between cyclic shifts by utilizing the whole duration of the comb-1-equivalent SRS.

The current implementation of the cyclic shift multiplexes different shifts over a given time span so that each cyclic shift is equally spaced. This is inefficient, however, as either the space between cyclic shifts could be extended to improve separation between signals, or the number of multiplexed signals could be extended while keeping the same separation between signals. This is illustrated in FIG. 7. Specifically, FIG. 7 is a diagram 700 of an example allocation of cyclic shifts that would extend the space between cyclic shifts by utilizing the whole duration of the comb-1-equivalent SRS. In FIG. 7, frequency is represented vertically and time is represented horizontally. Each block represents an RE and each shaded block represents an RE carrying SRS. The comb pattern in the example of FIG. 7 is a comb-4 pattern over four symbols, and therefore has an offset pattern of {0, 2, 1, 3}.

As shown in FIG. 7, the SRS RE on the first tone, which is also the first RE of the pattern, has a cyclic shift of $e^{j\alpha 0}$. However, the SRS RE on the second tone, rather than the second RE of the pattern (on the third tone of the second symbol), has a cyclic shift of $e^{j\alpha 1}$. Likewise, the SRS RE of the third tone, rather than the third RE of the pattern (on the second tone of the third symbol), has a cyclic shift of $e^{j\alpha 2}$. The SRS RE of the fourth tone, which is also the fourth RE of the pattern, has a cyclic shift of $e^{j\alpha 3}$. The pattern then repeats, incrementing n with each tone. To utilize the extended range from the staggered SRS resource, the SRS equation for sequence generation is dependent on both the frequency index and the symbol index so that the generated sequence spans the whole resource bandwidth.

The allocation of cyclic shifts illustrated in FIG. 7 allows more UEs to be multiplexed on the same frequency resources. However, an issue arises when one or more of the symbols on which the SRS resource is transmitted are canceled or punctured. Puncturing is a technique whereby when a lower priority signal overlaps (collides) with a higher priority signal in a symbol or slot, the transmission of the lower priority signal in the symbol or slot is canceled. SRS are generally lower priority than other channels (e.g., PUCCH, PUSCH), and therefore, when SRS collide with another channel, the SRS are dropped in the symbols or slots where the collision occurs.

However, when the cyclic shift number for each comb (a single RE of a comb pattern) is increased across tones (as illustrated in FIG. 7), rather than within a symbol (as illustrated in FIG. 6), SRS symbol dropping becomes an issue. This is because the increased cyclic shift number for each comb only maintains cyclic shift separation after the staggering across multiple SRS symbols and may therefore not work when some SRS symbols are dropped. If a UE transmits SRS on the remaining symbols, it may create interference for other intra-cell UEs on the same comb with different cyclic shifts.

Accordingly, the present disclosure introduces a puncturing (or cancellation) unit for SRS resources that can be used when, for example, the cyclic shift number for each comb is increased across tones rather than within a symbol. A puncturing unit may comprise one or more symbols or slots of an SRS resource. When one or more symbols (or slots) within a puncturing unit collide with another channel and would be dropped (punctured), the entire puncturing unit is dropped instead.

The base station that configured the UE with the SRS resources (including the comb pattern) may configure the UE with the puncturing unit for SRS resources. The puncturing unit should be consistent with the SRS staggering (comb pattern) that the base station applies for cyclic shift assignments across UEs. More specifically, when the amount of the phase rotation applied to the REs across symbols containing SRS transmissions follows the order of the occupied subcarriers, the cyclic shift separation among UEs is maintained after staggering across multiple SRS symbols, and may not hold if some SRS symbols are missing. In the latter case, transmission of SRS on the remaining symbols creates interference to other intra-cell UEs on the same comb with different cyclic shifts. As such, the base station should configure the UE with a puncturing unit that prevents such a scenario. The base station may configure the UE with the puncturing unit using, for example, RRC signaling. The base station may specify the puncturing unit as, for example, the length (e.g., in symbols or slots) of the puncturing unit, or the number of puncturing units per comb pattern.

Figure 8A:
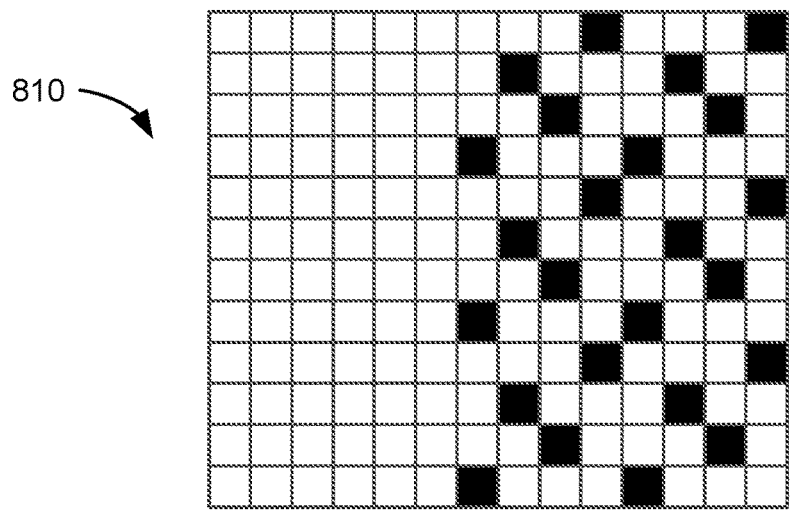
FIGS. 8A and 8B illustrate examples of different puncturing units within an example comb pattern, according to aspects of the disclosure.
Figure 8A:
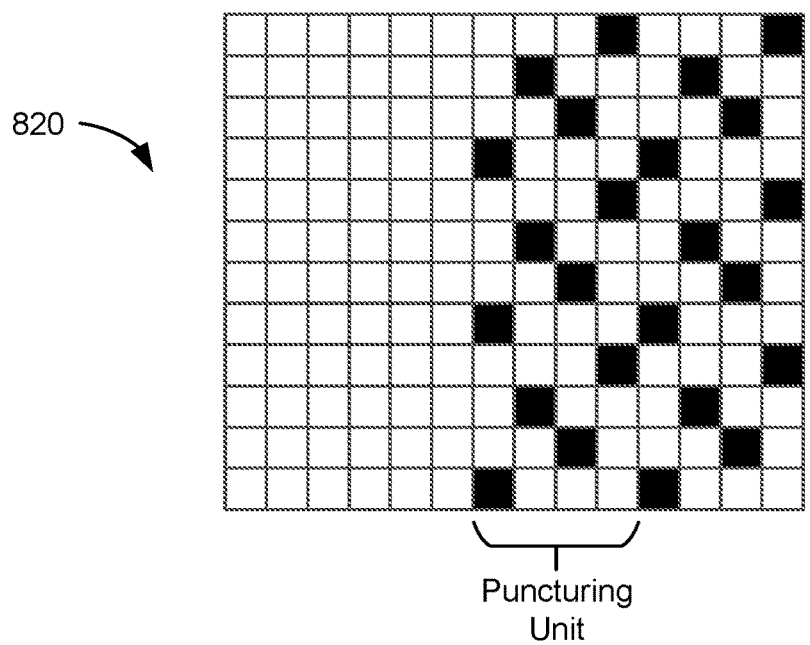
Figure 8B:
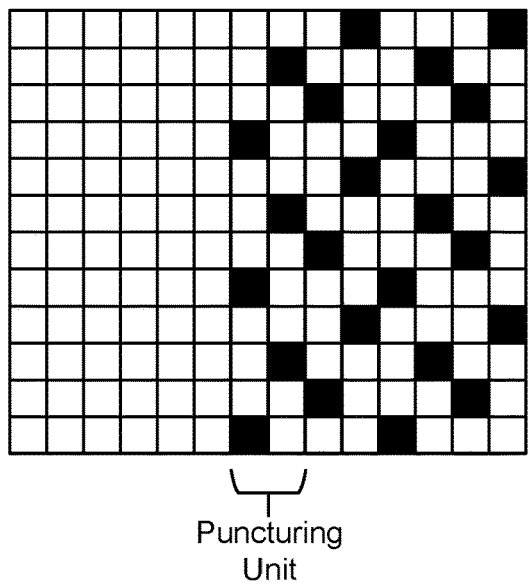
Figure 8B:
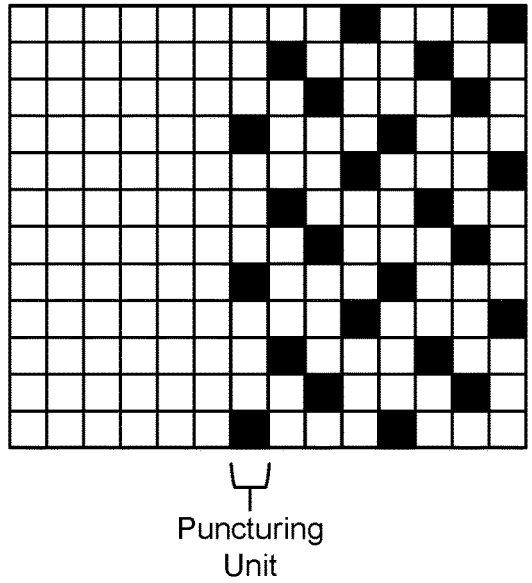

FIGS. 8A and 8B illustrate examples of different puncturing units within an example comb pattern, according to aspects of the disclosure. The comb pattern in the examples of FIGS. 8A and 8B is a comb-4 pattern over eight symbols, and therefore has an offset pattern of {0, 2, 1, 3, 0, 2, 1, 3}. Each comb pattern is illustrated within a single resource block. In each resource block, frequency is represented vertically and time is represented horizontally. Each block of each resource block represents an RE, and each shaded block represents an RE carrying SRS. All of the REs carrying SRS within an illustrated resource block correspond to an SRS resource.

FIG. 8A illustrates an eight-symbol comb-4 comb pattern 810 without a puncturing unit, and an eight-symbol comb-4 comb pattern 820 with a four-symbol puncturing unit. For the comb pattern 820, the base station assigns a cyclic shift with staggering every four symbols. That is, the cyclic shift number ($e^{j\alpha n}$) for each comb is increased across the tones of four consecutive symbols, as illustrated in FIG. 7. Note that while only one puncturing unit is shown, each group of four symbols of comb pattern 820 would correspond to a puncturing unit. If an SRS transmission within a symbol within a four-symbol puncturing unit collides with a higher priority channel, or otherwise needs to be cancelled, SRS transmissions within the entire puncturing unit are dropped, rather than just SRS transmissions within the colliding symbol.

FIG. 8B illustrates an eight-symbol comb-4 comb pattern 830 with a two-symbol puncturing unit. For the comb pattern 830, the base station assigns a cyclic shift with staggering every two symbols. That is, the cyclic shift number ($e^{j\alpha n}$) for each comb is increased across the tones of two consecutive symbols. Note that while only one puncturing unit is shown, each group of two symbols of comb pattern 830 would correspond to a puncturing unit. If an SRS transmission within a symbol within a two-symbol puncturing unit collides with a higher priority channel, or otherwise needs to be cancelled, SRS transmissions within the entire puncturing unit are dropped, rather than just SRS transmissions within the colliding symbol.

FIG. 8B further illustrates an eight-symbol comb-4 comb pattern 840 with a one-symbol puncturing unit. For the comb pattern 840, the base station assigns a cyclic shift with staggering every one symbol. That is, the cyclic shift number ($e^{j\alpha n}$) for each comb is increased across the tones of a single symbol. This is effectively the situation illustrated in FIG. 6. Note that while only one puncturing unit is shown, each group of one symbols of comb pattern 840 would correspond to a puncturing unit. If an SRS transmission within a symbol within a one-symbol puncturing unit collides with a higher priority channel, or otherwise needs to be cancelled, SRS transmissions within the entire puncturing unit are dropped, rather than just SRS transmissions within the colliding symbol. This is effectively the situation described with reference to FIG. 6.

As will be appreciated, while FIGS. 8A and 8B illustrate examples for an eight-symbol comb-4 comb pattern, the present techniques are applicable to any comb pattern. In addition, while FIGS. 8A and 8B illustrate puncturing units of one, two, and four symbols, as will be appreciated, other lengths are possible, and may depend on the length (in the time domain) of the comb pattern (e.g., 1, 2, 4, 8, or 12 symbols). Further, while FIGS. 8A to 8B illustrate example comb patterns within a single resource block, as will be appreciated, the comb pattern may extend over multiple resource blocks in the frequency domain. For example, FIGS. 6 and 7 illustrate comb patterns extending over two resource blocks in the frequency domain. Further, while the foregoing has generally described puncturing units in terms of length of symbols, they may instead be defined in terms of lengths of slots, depending on, for example, the processing and/or transmission capabilities of the UE.

Figure 9:
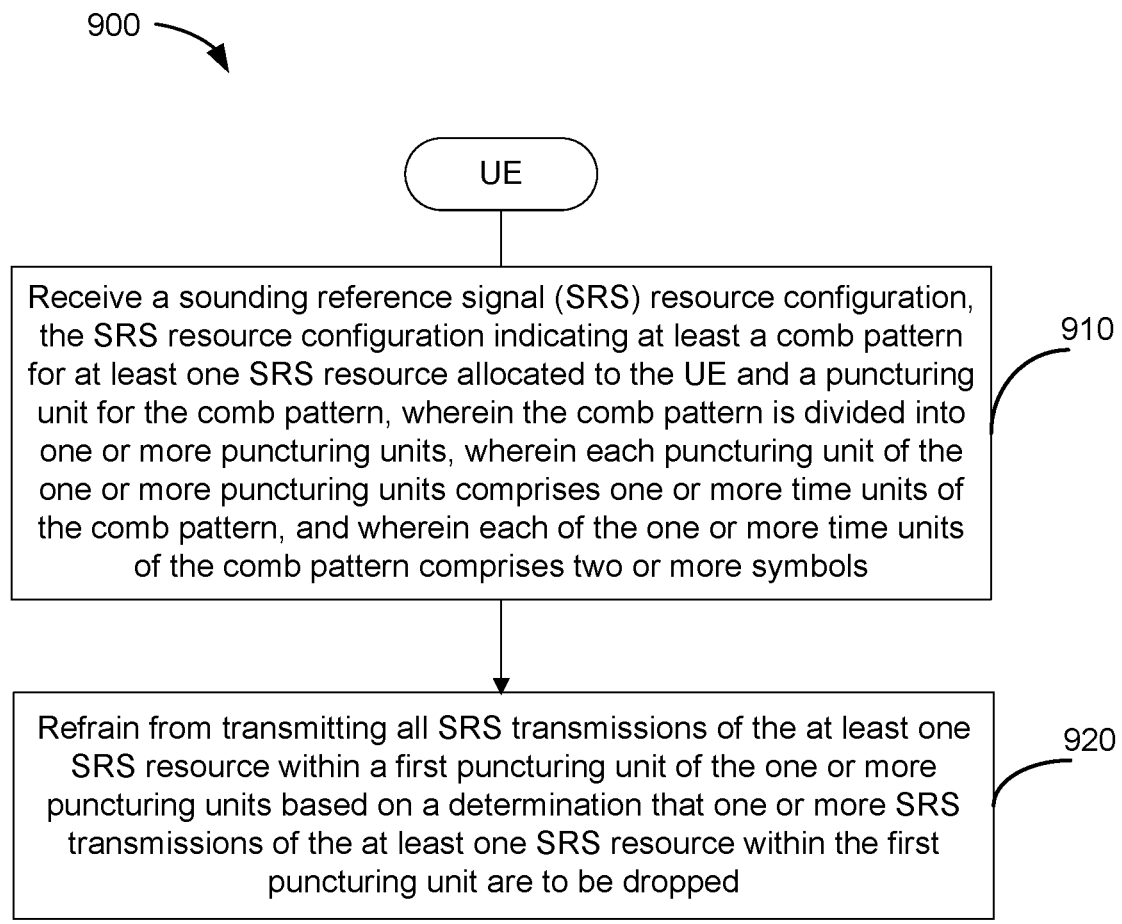
FIG. 9 illustrates an example method for wireless communication, according to aspects of the disclosure.

FIG. 9 illustrates an example method 900 of wireless communication, according to aspects of the disclosure. In an aspect, method 900 may be performed by a UE (e.g., any of the UEs described herein).

At 910, the UE receives an SRS resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols. In an aspect, operation 910 may be performed by the one or more WWAN transceivers 310, the one or more processors 332, memory 340, and/or SRS configuration component 342, any or all of which may be considered means for performing this operation.

At 920, the UE refrains from transmitting all SRS transmissions of the at least one SRS resource within a first puncturing unit of the one or more puncturing units based on a determination that one or more SRS transmissions of the at least one SRS resource within the first puncturing unit are to be dropped. In an aspect, operation 920 may be performed by the one or more WWAN transceivers 310, the one or more processors 332, memory 340, and/or SRS configuration component 342, any or all of which may be considered means for performing this operation.

As will be appreciated, a technical advantage of the method 900 is decreased interference to other UEs and reduced power consumption for the UE.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, and wherein each puncturing unit of the one or more puncturing units comprises one or more time units of the comb pattern; determining that one or more SRS transmissions of the SRS resource within a first puncturing unit of the one or more puncturing units are to be dropped; and refraining from transmitting all SRS transmissions of the SRS resource within the first puncturing unit.

Clause 2. The method of clause 1, wherein the one or more time units comprise one or more symbols or one or more slots.

Clause 3. The method of any of clauses 1 to 2, wherein the one or more time units of the comb pattern comprise one symbol or two symbols based on the comb pattern having a length of two symbols.

Clause 4. The method of any of clauses 1 to 3, wherein the one or more time units of the comb pattern comprise one symbol, two symbols, or four symbols based on the comb pattern having a length of four symbols.

Clause 5. The method of any of clauses 1 to 4, wherein the one or more time units of the comb pattern comprise one symbol, two symbols, four symbols, or eight symbols based on the comb pattern having a length of eight symbols.

Clause 6. The method of any of clauses 1 to 5, wherein the one or more time units of the comb pattern comprise one symbol, two symbols, four symbols, six symbols, or 12 symbols based on the comb pattern having a length of 12 symbols.

Clause 7. The method of any of clauses 1 to 6, wherein a cyclic shift number for each resource element of the SRS resource is increased across tones of the comb pattern.

Clause 8. The method of any of clauses 1 to 7, wherein the comb pattern spans one or more resource blocks in a frequency domain.

Clause 9. The method of any of clauses 1 to 8, wherein the SRS configuration is received from a serving base station.

Clause 10. The method of any of clauses 1 to 9, wherein the determining comprises: determining that the one or more SRS transmissions of the SRS resource within the first puncturing unit collides with a higher priority channel.

Clause 11. The method of clause 10, wherein the higher priority channel comprises a physical uplink control channel (PUCCH) or a physical uplink shared channel (PUSCH).

Clause 12. The method of any of clauses 1 to 11, wherein the determining comprises: determining that the one or more SRS transmissions of the SRS resource within the first puncturing unit are to be canceled.

Clause 13. The method of any of clauses 1 to 12, wherein an indication in the SRS configuration of the puncturing unit comprises a number of the one or more time units.

Clause 14. The method of any of clauses 1 to 13, wherein an indication in the SRS configuration of the puncturing unit comprises a number of the one or more time units of each of the one or more puncturing units.

Clause 15. An apparatus comprising a memory, at least one transceiver, and at least one processor communicatively coupled to the memory and the at least one transceiver, the memory, the at least one transceiver, and the at least one processor configured to perform a method according to any of clauses 1 to 14.

Clause 16. An apparatus comprising means for performing a method according to any of clauses 1 to 14.

Clause 17. A non-transitory computer-readable medium storing computer-executable instructions, the computer-executable comprising at least one instruction for causing a computer or processor to perform a method according to any of clauses 1 to 14.

Additional implementation examples are described in the following numbered clauses:

Clause 1. A method of wireless communication performed by a user equipment (UE), comprising: receiving a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and refraining from transmitting all SRS transmissions of the at least one SRS resource within a first puncturing unit of the one or more puncturing units based on a determination that one or more SRS transmissions of the at least one SRS resource within the first puncturing unit are to be dropped.

Clause 2. The method of clause 1, wherein the one or more time units comprise two or more symbols within one or more slots.

Clause 3. The method of any of clauses 1 to 2, wherein a number of the one or more time units is based on a length of the comb pattern or a configuration from a serving base station.

Clause 4. The method of any of clauses 1 to 3, wherein a number of the one or more time units is based on a configuration from a serving base station.

Clause 5. The method of any of clauses 1 to 4, wherein the one or more time units comprise two symbols or four symbols based on the comb pattern having a length of four symbols.

Clause 6. The method of any of clauses 1 to 4, wherein the one or more time units comprise two symbols, four symbols, or eight symbols based on the comb pattern having a length of eight symbols.

Clause 7. The method of any of clauses 1 to 4, wherein the one or more time units comprise two symbols, four symbols, six symbols, or 12 symbols based on the comb pattern having a length of at least 12 symbols.

Clause 8. The method of any of clauses 1 to 7, wherein a cyclic shift number for each resource element of the at least one SRS resource increases across tones of the comb pattern.

Clause 9. The method of any of clauses 1 to 7, wherein a cyclic shift number for each resource element of the at least one SRS resource decreases across tones of the comb pattern.

Clause 10. The method of any of clauses 1 to 9, wherein the determination comprises a determination that the one or more SRS transmissions of the at least one SRS resource within the first puncturing unit collides with a higher priority channel.

Clause 11. The method of clause 10, wherein the higher priority channel comprises a physical uplink control channel (PUCCH) or a physical uplink shared channel (PUSCH).

Clause 12. The method of any of clauses 1 to 9, wherein the determination comprises a determination that the one or more SRS transmissions of the at least one SRS resource within the first puncturing unit are to be canceled.

Clause 13. The method of any of clauses 1 to 12, wherein an indication in the SRS resource configuration of the puncturing unit comprises a number of the one or more time units.

Clause 14. The method of any of clauses 1 to 13, wherein an indication in the SRS resource configuration of the puncturing unit comprises a number of the one or more time units of each of the one or more puncturing units.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    receiving a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and
    refraining from transmitting all SRS transmissions of the at least one SRS resource within a first puncturing unit of the one or more puncturing units based on a determination that one or more SRS transmissions of the at least one SRS resource within the first puncturing unit are to be dropped.

2. The method of claim 1, wherein the one or more time units comprise two or more symbols within one or more slots.

3. The method of claim 1, wherein a number of the one or more time units is based on a length of the comb pattern or a configuration from a serving base station.

4. The method of claim 1, wherein a number of the one or more time units is based on a configuration from a serving base station.

5. The method of claim 1, wherein the one or more time units comprise two symbols or four symbols based on the comb pattern having a length of four symbols.

6. The method of claim 1, wherein the one or more time units comprise two symbols, four symbols, or eight symbols based on the comb pattern having a length of eight symbols.

7. The method of claim 1, wherein the one or more time units comprise two symbols, four symbols, six symbols, or 12 symbols based on the comb pattern having a length of at least 12 symbols.

8. The method of claim 1, wherein a cyclic shift number for each resource element of the at least one SRS resource increases across tones of the comb pattern.

9. The method of claim 1, wherein a cyclic shift number for each resource element of the at least one SRS resource decreases across tones of the comb pattern.

10. The method of claim 1, wherein the determination comprises a determination that the one or more SRS transmissions of the at least one SRS resource within the first puncturing unit collides with a higher priority channel.

11. The method of claim 10, wherein the higher priority channel comprises a physical uplink control channel (PUCCH) or a physical uplink shared channel (PUSCH).

12. The method of claim 1, wherein the determination comprises a determination that the one or more SRS transmissions of the at least one SRS resource within the first puncturing unit are to be canceled.

13. The method of claim 1, wherein an indication in the SRS resource configuration of the puncturing unit comprises a number of the one or more time units.

14. The method of claim 1, wherein an indication in the SRS resource configuration of the puncturing unit comprises a number of the one or more time units of each of the one or more puncturing units.

15. A user equipment (UE), comprising:
a memory;
at least one transceiver; and
at least one processor communicatively coupled to the memory and the at least one transceiver, the at least one processor configured to:
receive, via the at least one transceiver, a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and
refrain from transmitting all SRS transmissions of the at least one SRS resource within a first puncturing unit of the one or more puncturing units based on a determination that one or more SRS transmissions of the at least one SRS resource within the first puncturing unit are to be dropped.

16. The UE of claim 15, wherein the one or more time units comprise two or more symbols within one or more slots.

17. The UE of claim 15, wherein a number of the one or more time units is based on a length of the comb pattern or a configuration from a serving base station.

18. The UE of claim 15, wherein a number of the one or more time units is based on a configuration from a serving base station.

19. The UE of claim 15, wherein the one or more time units comprise two symbols or four symbols based on the comb pattern having a length of four symbols.

20. The UE of claim 15, wherein the one or more time units comprise two symbols, four symbols, or eight symbols based on the comb pattern having a length of eight symbols.

21. The UE of claim 15, wherein the one or more time units comprise two symbols, four symbols, six symbols, or 12 symbols based on the comb pattern having a length of at least 12 symbols.

22. The UE of claim 15, wherein a cyclic shift number for each resource element of the at least one SRS resource increases across tones of the comb pattern.

23. The UE of claim 15, wherein a cyclic shift number for each resource element of the at least one SRS resource decreases across tones of the comb pattern.

24. The UE of claim 15, wherein the determination comprises a determination that the one or more SRS transmissions of the at least one SRS resource within the first puncturing unit collides with a higher priority channel.

25. The UE of claim 24, wherein the higher priority channel comprises a physical uplink control channel (PUCCH) or a physical uplink shared channel (PUSCH).

26. The UE of claim 15, wherein the determination comprises a determination that the one or more SRS transmissions of the at least one SRS resource within the first puncturing unit are to be canceled.

27. The UE of claim 15, wherein an indication in the SRS resource configuration of the puncturing unit comprises a number of the one or more time units.

28. The UE of claim 15, wherein an indication in the SRS resource configuration of the puncturing unit comprises a number of the one or more time units of each of the one or more puncturing units.

29. A user equipment (UE), comprising:
means for receiving a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and
means for refraining from transmitting all SRS transmissions of the at least one SRS resource within a first puncturing unit of the one or more puncturing units based on a determination that one or more SRS transmissions of the at least one SRS resource within the first puncturing unit are to be dropped.

30. A non-transitory computer-readable medium storing computer-executable instructions that, when executed by a user equipment (UE), cause the UE to:
receive a sounding reference signal (SRS) resource configuration, the SRS resource configuration indicating at least a comb pattern for at least one SRS resource allocated to the UE and a puncturing unit for the comb pattern, wherein the comb pattern is divided into one or more puncturing units, wherein each puncturing unit of the one or more puncturing units comprises one or more time units of the comb pattern, and wherein each of the one or more time units of the comb pattern comprises two or more symbols; and refrain from transmitting all SRS transmissions of the at least one SRS resource within a first puncturing unit of the one or more puncturing units based on a determination that one or more SRS transmissions of the at least one SRS resource within the first puncturing unit are to be dropped.

* * * * *